No. 613,777. Patented Nov. 8, 1898.
W. H. PUTNAM.
NUT LOCK.
(Application filed Mar. 7, 1898.)
(No Model.)

WITNESS

INVENTOR
William H. Putnam,
BY
Edgar Tate &Co.
ATTORNEYS

THE NORRIS PETERS CO., PHOTO-LITHO., WASHINGTON, D. C.

UNITED STATES PATENT OFFICE.

WILLIAM H. PUTNAM, OF LITCHFIELD, ILLINOIS.

NUT-LOCK.

SPECIFICATION forming part of Letters Patent No. 613,777, dated November 8, 1898.

Application filed March 7, 1898. Serial No. 672,961. (No model.)

*To all whom it may concern:*

Be it known that I, WILLIAM H. PUTNAM, a citizen of the United States, residing at Litchfield, in the county of Montgomery and State of Illinois, have invented certain new and useful Improvements in Nut-Locks, of which the following is a full and complete specification, such as will enable those skilled in the art to which it appertains to make and use the same.

This invention relates to lock-nuts, and to that class thereof in which a lock is formed by means of a frictional contact between the threads of the nut and the threads of the bolt.

The object is to provide a cheap, simple, and effective lock-nut which will be easily applied and reliable in operation.

The invention consists of a lock-nut constructed substantially as hereinafter described, and defined in the claims.

The invention is fully disclosed in the following specification, of which the accompanying drawings form a part, in which the separate parts of my improvement are designated by the same letters of reference in each of the views, and in which—

Figure 1:
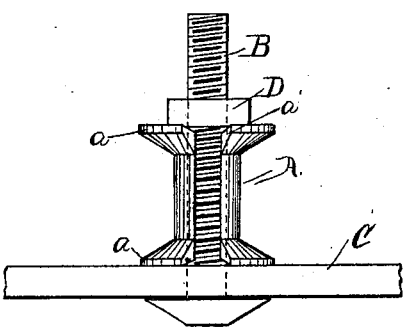
Figure 2:
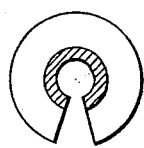
Figure 3:
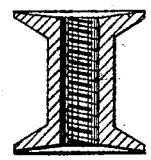
Figure 6:
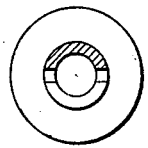
Figure 4:
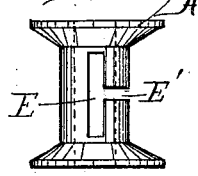
Figure 5:
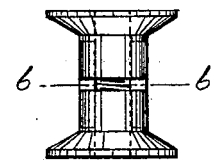

Figure 1 is a front view of one form of my improved nut-lock. Fig. 2 is a transverse central section of Fig. 1, the bolt being removed. Fig. 3 is a vertical central section of the nut-lock shown in Fig. 1. Fig. 4 is a side view of a modification. Fig. 5 is a front view thereof, and Fig. 6 is a section on the line 6 6 of Fig. 5.

In the drawings forming part of this specification I have shown at C a plate or board, and at B a screw-threaded bolt which is passed through said plate or board, and at A my improved lock-nut, which is mounted on said bolt and held in place thereon by a set-nut D. The nut A is screw-threaded interiorly and is oblong in form, and the body portion of said nut is cylindrical in form and provided at each end with a circular projecting head a, whereby the said nut is made spool-shaped in form, and the circular projecting heads a are formed by an annular extended groove between the same of considerable width, whereby the body portion of the nut is reduced and weakened and the said circular heads are preferably beveled on their adjacent sides or adjacent to the body portion of the nut, and upon their outer faces said heads are preferably provided with shallow depressions, whereby they are made dish-shaped in form and the bearing-surfaces thereof reduced. As thus constructed it will be seen that the head of the nut which rests on the plate C bears on said plate only at its perimeter, and the set-nut D also bears on the opposite head, near the perimeter thereof.

A longitudinal slot a' is formed in one side of the nut A and communicates with the central bore thereof, and also extends through the circular heads a, and the nut is adapted to be screwed onto the bolt B until it is firmly seated on the plate C, and the application of a heavy wrench will cause the nut to slightly yield upon its weaker side because of the strain between the threads thereof.

The supplementary or set nut D may be applied upon the top of the nut A and will not only aid to cause the yielding of the nut A upon its weaker side, but will also tend to retain said nut in operative position.

Instead of weakening the nut A by means of the longitudinal slot a, as shown in Figs. 1 and 2, I may employ the construction illustrated in Figs. 4, 5, and 6, wherein the nut A is provided with longitudinal slots E, in the opposite sides of the body thereof, which do not extend through the circular heads a, but which do communicate with the interiorly-screw-threaded bore of the nut, and a transverse slot E' is also formed in one side of the body of the nut which communicates at its opposite ends with the slots E, and the operation of this form of construction is the same as that hereinbefore described.

The depressions or cavities in the outer sides of the heads a of the nut A are not absolutely essential, and in the construction shown in Figs. 4 and 5 they are omitted, and it will be obvious from the construction of my improved lock-nut shown in Fig. 4 that when forcibly turned down or screwed down upon its seat or when under the binding action of the jam-nut D said nut A will yield under pressure upon its weaker side and its threads becoming distorted will firmly bind the nut to the bolt, and after being once secured in position the nut A can only be removed by the application of considerable power by means of a wrench or by mutilating the nut.

Having fully described my invention, I claim as new and desire to secure by Letters Patent—

1. A lock-nut which is spool-shaped in form, said nut being composed of a central cylindrical body and enlarged circular heads, said nut being also provided with a central bore which passes therethrough and through said heads and with a longitudinal slot formed in one side thereof, substantially as shown and described.

2. A lock-nut, comprising a cylindrical body portion having at its opposite ends enlarged circular heads which are dish-shaped in form, the concave surfaces thereof being directed outwardly, substantially as shown and described.

3. A lock-nut, comprising a cylindrical body portion having at its opposite ends enlarged circular heads which are dish-shaped in form, the concave surfaces thereof being directed outwardly, said nut being also provided in the body thereof with a longitudinal slot, substantially as shown and described.

4. A lock-nut, comprising a cylindrical body portion provided at each end with circular heads, the body portion of said nut being also provided with a longitudinal slot which communicates with the central bore thereof, and in one side with a transverse slot which communicates with said longitudinal slot, substantially as shown and described.

In testimony that I claim the foregoing as my invention I have signed my name, in presence of the subscribing witnesses, this 21st day of February, 1898.

WILLIAM H. PUTNAM.

Witnesses:
RICHARD H. PUTNAM,
THEODORE HILLER.